(12) United States Patent
Duong

(10) Patent No.: US 10,133,955 B2
(45) Date of Patent: Nov. 20, 2018

(54) SYSTEMS AND METHODS FOR OBJECT RECOGNITION BASED ON HUMAN VISUAL PATHWAY

(71) Applicant: Adaptive Computation, LLC, Glendora, CA (US)

(72) Inventor: Tuan A. Duong, Glendora, CA (US)

(73) Assignee: Adaptive Computation, LLC, Glendora, CA (US)

( * ) Notice: Subject to any disclaimer, the term of this patent is extended or adjusted under 35 U.S.C. 154(b) by 275 days.

(21) Appl. No.: 14/986,057

(22) Filed: Dec. 31, 2015

(65) Prior Publication Data

US 2017/0193325 A1 Jul. 6, 2017

(51) Int. Cl.
*G06K 9/00* (2006.01)
*G06K 9/46* (2006.01)
*G06K 9/62* (2006.01)
*G06T 3/40* (2006.01)
*G06K 9/52* (2006.01)
*G06T 7/20* (2017.01)
(Continued)

(52) U.S. Cl.
CPC ........ *G06K 9/4671* (2013.01); *G06K 9/0061* (2013.01); *G06K 9/00268* (2013.01); *G06K 9/00335* (2013.01); *G06K 9/00617* (2013.01); *G06K 9/52* (2013.01); *G06K 9/6201* (2013.01); *G06K 9/66* (2013.01); *G06T 3/40* (2013.01); *G06T 7/0081* (2013.01); *G06T 7/20* (2013.01); *G06K 9/00* (2013.01); *G06K 2009/4666* (2013.01); *G06T 2207/20021* (2013.01); *G06T 2207/30196* (2013.01); *G06T 2207/30201* (2013.01)

(58) Field of Classification Search
CPC .................................................. G06K 9/4619
See application file for complete search history.

(56) References Cited

U.S. PATENT DOCUMENTS 8,340,435 B2 * 12/2012 Duong ................... G06K 9/342
382/190
8,510,244 B2 * 8/2013 Carson ..................... G06N 3/02
706/27
(Continued)

OTHER PUBLICATIONS

Excel et al., "Space-variant representation for active object recognition", SIBGRAPI '98, Oct. 1998.*
(Continued)

*Primary Examiner* — Soo Park
*Assistant Examiner* — Soo Jin Park
(74) *Attorney, Agent, or Firm* — Schwabe, Willaimson & Wyatt, P.C.

(57) ABSTRACT

Methods, systems, and storage media are described for detecting objects in image data are provided. In embodiments, a computing device may generate a plurality of blocks from a captured image. Each block may represent a corresponding region of the captured image. The computing device may extract a first feature from at least one block of the plurality of blocks; determine a second feature based at least on the first feature; and determine a third feature based on the second feature. The computing device may determine, as a matching image, a stored image from among a plurality of stored images including an object that has greatest maximum correlation with the third feature. Other embodiments may be described and/or claimed.

20 Claims, 7 Drawing Sheets

(51) Int. Cl.
*G06K 9/66* (2006.01)
*G06T 7/00* (2017.01)

(56) References Cited

U.S. PATENT DOCUMENTS

| | | | | |
|---|---|---|---|---|
| 9,501,710 B2* | 11/2016 | Karam | ............ | G06K 9/4604 |
| 9,626,566 B2* | 4/2017 | Versace | ............ | G06K 9/00664 |
| 2007/0239314 A1* | 10/2007 | Kuvich | ............ | G06K 9/4628 |
| | | | | 700/245 |
| 2017/0024877 A1* | 1/2017 | Versace | ............ | G06K 9/00664 |
| 2017/0193298 A1* | 7/2017 | Versace | ............ | G06K 9/00664 |

OTHER PUBLICATIONS

Gould et al., "Peripheral-foveal vision for real-time object recognition and tracking in video", IJCAI 2007.*

Akbas et al., "Object detection through exploration with a foveated visual field", arXiv:1408.0814, Aug. 2014.*
Giefing et al., "Saccadic object recognition with an active vision system", 1992 ICPR, Aug. 1992.*
Kuvich, "Perception system with scene understanding capabilities upon network-symbolic models for intelligent tactical behavior of mobile robots in real-world environments", Proceedings vol. 6006, Intelligent Robots and Computer Vision XXIII: Algorithms, Techniques, and Active Vision; 60060Z (2005).*
Ratter et al., "Fast object detection with foveated imaging and virtual saccades on resource limited robots", In: Wang D., Reynolds M. (eds) AI 2011: Advances in Artificial Intelligence. AI 2011. Lecture Notes in Computer Science, vol. 7106. Springer, Berlin, Heidelberg.*
Rea et al., "Motor biases in visual attention for a humanoid robot", 2014 14th IEEE-RAS International Conference on Humanoid Robots (Humanoids), Nov. 2014.*
Turski, "Robotic vision with the conformal camera: modeling perisaccadic perception", Journal of Robotics, vol. 2010, 2010.*

* cited by examiner

SYSTEMS AND METHODS FOR OBJECT RECOGNITION BASED ON HUMAN VISUAL PATHWAY

FIELD

The present disclosure relates to the fields of image processing, and in particular, to apparatuses, methods and storage media associated with object recognition based on a human visual pathway.

BACKGROUND

Object recognition, and in particular, human facial recognition, typically includes a computer application that is capable of identifying the identity of a person from a digital image or video.

Some object recognition algorithms identify objects in an image or video by extracting landmarks, or features, from the image or video. Such object recognition algorithms may be referred to as geometric algorithms. For example, geometric facial recognition algorithm may identify facial features by extracting landmarks/features from an image of a human face, and may analyze the relative position, size, and/or shape of the eyes, nose, cheekbones, jaw, lips, and/or other facial features of the human face in the image (the person or object in an image may be referred to as the "subject of the image" or "subject", and the image representing the person or object to be identified may be referred to as a "subject image"). However, geometric algorithms typically require high resolution and/or low noise images in order to properly detect objects or facial features within the image. Additionally, geometric facial recognition algorithms usually require a complete picture of a subject in order to determine the relative position, size, and/or shape of the facial features of the subject. Furthermore, such algorithms typically require a relatively large set of sample images upon which to compare an object against in order to determine the identity of a subject. Moreover, geometric facial recognition algorithms may encounter errors when the subject image has different dimensions than the dimensions of a sample set of images due to translation (for example, scaled, rotated, skewed, and the like) of the subject image to fit the dimensions of sample images.

Humans' visual systems possess versatile and flexible tools to detect, recognize and identify objects in a dynamic real world environment and are capable of reasoning and extrapolating information effectively. However, human visual systems may face fatigue and be incapable of processing information at high speeds, may be very slow in partial or component processing, and may be unable to memorize many objects in a short time.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
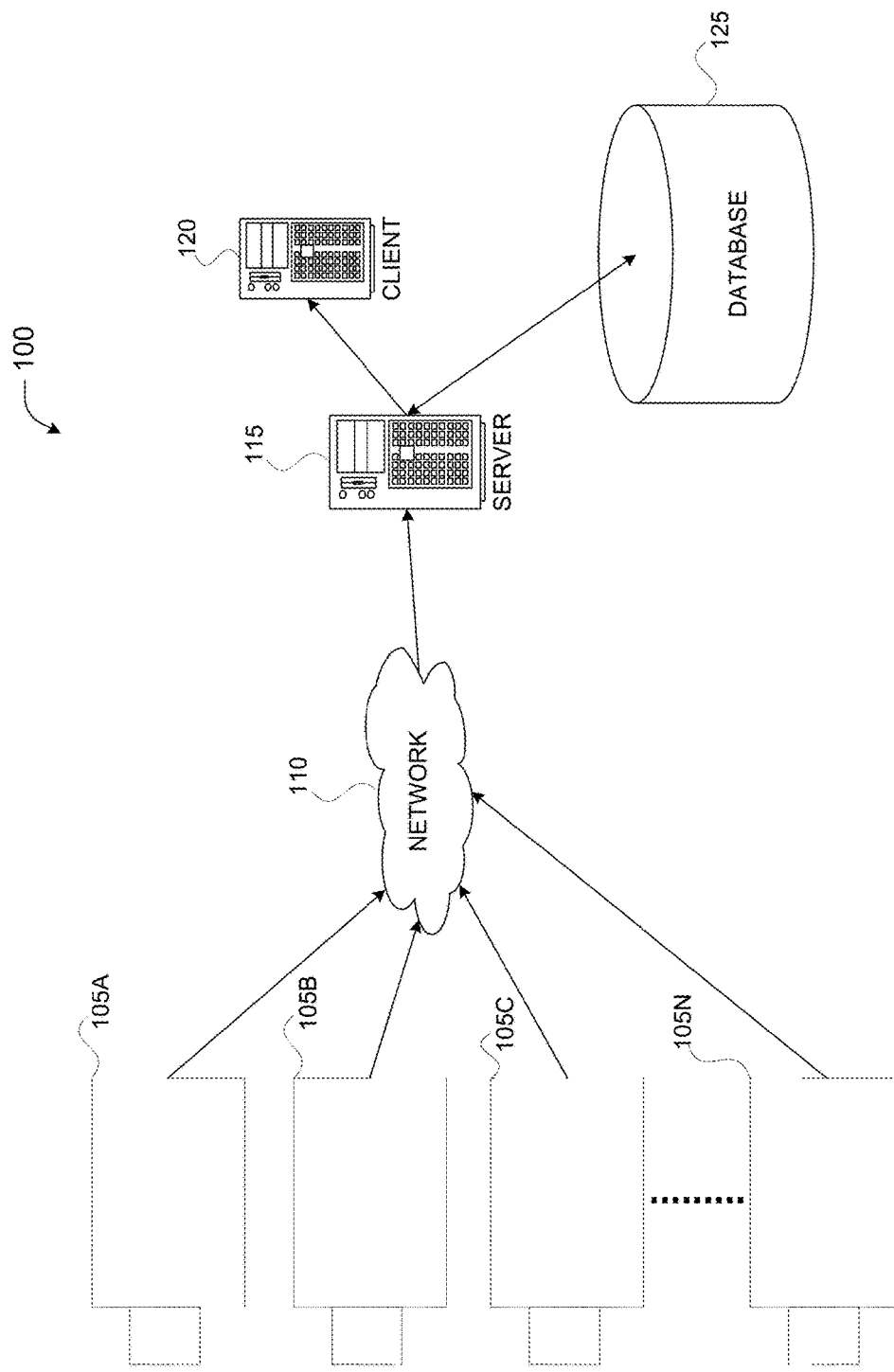
FIG. 1 illustrates an example arrangement in which example embodiments described in the present disclosure may be implemented.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural and/or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions and/or operations in turn, in a manner that is most helpful in understanding the claimed subject matter. However, the order of description should not be construed to imply that the various operations are necessarily order dependent. In particular, these operations may not be performed in the order of presentation. Operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). For the purposes of the present disclosure, the phrase "at least one of A and B" means (A), (B), or (A and B).

The description may use the phrases "in an embodiment", or "in embodiments", which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, one or more processors (shared, dedicated, or group) and/or memory (shared, dedicated, or group) that execute one or more software or firmware programs, a combinational logic circuit, and/or other suitable components that provide the described functionality.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

Example embodiments disclosed herein provide systems and methods for object recognition in image or video data. The example embodiments may be considered to be a bio-inspired model that emulates saccadic eye movements and extracts features from captured image data based on a biological visual pathway, such as by emulating the retina, fovea, and lateral geniculate nucleus (LGN) of a vertebrate. In embodiments, an input image is provided to a saccadic eye emulator that may sequentially scan the input image to focus on one or more objects of interest and/or features within the object (e.g., when the input image includes a person, the saccadic eye emulator may focus on the eyes, nose, lips, etc., of the face of the person). Statistical data of components within the object (e.g., one or more features) may be constructed from different locations of different light intensity of the input image. In embodiments, the saccadic eye emulator generates a set of images or blocks in different locations of the input image. Principal component analysis (PCA) and/or feature extraction algorithms (FEA) may be used to obtain vertebrate features and fovea features, which are based on vertebrate retina horizontal cells and retinal ganglion cells, respectively.

FIG. 1 illustrates an arrangement 100, according to an example embodiment. The arrangement 100 includes image capture devices 105-1-105-N, network 110, server 115, client device 120, and database 125.

Each of the image capture devices 105-1-105-N (where N≥1) (hereinafter referred to as "image capture devices 105" or "image capture device 105") may be any device capable of capturing images and/or video data. For example, in various embodiments, image capture devices 105 may include optical cameras including an optical lens and one or more digital image sensors, such as a charge-coupled device (CCD), a complementary metal-oxide-semiconductor (CMOS) sensor chip, active-pixel sensor (APS), and/or any other suitable image capture device. In some embodiments, image capture devices 105 may include thermographic (infrared) cameras, which may be similar to optical-lens cameras, but instead operate in wavelengths in the infrared range of the electromagnetic spectrum. In some embodiments, image capture devices 105 may include a lens-less image capture mechanism, which may include an aperture assembly and a sensor. The aperture assembly may include a two dimensional array of aperture elements, and the sensor may be a single detection element, such as a single photo-conductive cell. Each aperture element together with the sensor may define a cone of a bundle of rays, and the cones of the aperture assembly define the pixels of an image.

In some embodiments, the image capture devices 105 may also include one or more processors, one or more memory devices, and one or more communications modules. The one or more memory devices may be one or more computer readable storage medium that generally includes a computer readable storage medium that generally includes a random access memory (RAM), read only memory (ROM), a flash memory device, a solid state disk (SSD), a secure digital (SD) card, and/or other like storage media capable of storing and recording data. The one or more processors may include any combination of general-purpose processors and/or dedicated processors (for example, graphics processors, application processors, one or more ASICs, etc.). The processors may be coupled with the one or more memory devices and configured to execute instructions stored in the one or more memory devices to enable various applications and/or operating systems running on the system. Such applications and/or operating systems may allow the image capture devices 105 to capture an image, and process and/or record/store such images, for example by encoding and/or compressing a source signal and/or captured video using any suitable compression algorithm. In other embodiments, the image capture devices 105 may capture images and transmit the captured images to the server 115 as raw data. The captured images may be transmitted to the server 115 using the one or more communications modules. Each of the one or more communications modules may connect the image capture devices 105 to a computer network (e.g., network 110) via a wired or wireless connection. Some of the one or more communications modules may operate in conjunction with corresponding network interface and/or a wireless transmitter/receiver and/or transceiver (not shown) that is configured to operate in accordance with one or more wireless standards. Each wireless transmitter/receiver and/or transceiver may be configured to operate in accordance with a wireless communications standard, such as the Global System for Mobile Communications (GSM), Long Term Evolution (LTE), Bluetooth, Wireless Fidelity (Wi-Fi) such as the Institute of Electrical and Electronics Engineers (IEEE) 802.11 protocols, voice over Internet Protocol (VoIP), Wi-MAX, and/or any other "wireless" communication protocols, including RF-based, optical, and so forth. Some of the one or more communications modules may operate in conjunction with corresponding network interface that is configured to operate in accordance with one or more wired communications standards or protocols, such as a serial communications protocol (e.g., the USB, FireWire, SDI, and/or other like serial communications protocols), a parallel communications protocol (e.g., IEEE 1284, CAMAC, and/or other like parallel communications protocols), and/or a network communications protocol (e.g., Ethernet, token ring, fiber distributed data interface (FDDI), and/or other like network communications protocols). The communication modules may also include one or more virtual network interfaces configured to operate with various image capture and/or image processing applications.

Network 110 may be any network that allows computers to exchange data. Network 110 may include one or more network elements (not shown) capable of physically or logically connecting computers. In various embodiments, network 110 may be the Internet, a Wide Area Network (WAN), a personal area network (PAN), local area network (LAN), campus area network (CAN), metropolitan area network (MAN), a virtual local area network (VLAN), or other like networks capable of physically or logically connecting computers. Additionally, in various embodiments, network 110 may be a private and/or secure network, which is used by a single organization (e.g., a business, a school, a government agency, and the like).

Server 115 is a computing device that may include one or more systems and/or applications for processing a source signal, image data, and/or video data (e.g., a signal, image, or video captured by at least one of the image capture devices 105) for object recognition in the source signal. Server 115 may include a processor, memory or computer readable storage medium, network interface, and other like hardware components. The server 115 may be any computing device capable of receiving and responding to requests from one or more client devices (e.g., client 120) across a computer network (e.g., network 110) to provide one or more services. Accordingly, server 115 may be configured to communicate with the image capture devices 105 and client 120 via a wired or wireless protocol, which may be the same or similar to the wired and wireless protocols discussed previously. Additionally, server 115 may be a single physical hardware device, or server 115 may include a plurality of physically or logically connected computing devices, such that the server 115 may reside on one or more physical hardware devices. In various embodiments, server 115 is configured to operate a bio-inspired feature extraction engine (BIFEE) 500 (discussed with regard to FIGS. 3-4) to extract one or more features from a received source signal, image, and/or video stream, as captured and/or recorded by the image capture devices 105; compare the extracted feature(s) with features of objects or persons of stored images (e.g., stored in database 125); and determine and/or identify a person or object based on the comparison. In such embodiments, server 115 may also be configured to notify one or more client devices (e.g., client 120) when an identification has been detected by issuing a flag, alert, message or other like indication that an identification has been made.

Client device 120 may be a hardware computing device capable of communicating with a server (e.g., server 115), such that client device 120 is able to receive services from the server 115. Client device 120 may include memory, one or more processors, network interface, and/or other like hardware components. Such hardware components may be the same or similar to the memory devices, processors, network interfaces, etc., as discussed herein. Client device 120 may include devices such as desktop computers, laptop computers, cellular phones, tablet personal computers, and the like. Client device 120 may be configured to run, execute, or otherwise operate one or more applications. In some embodiments, an application may be developed by a content provider (e.g., a service provider that operates the server 115) so that a user may use the client device 120 to query or otherwise request the server 115 to identify persons or objects in a captured image. Such applications may be platform or operating system (OS) specific, which may be developed for a specific platform using platform-specific development tools, programming languages, and the like. In other embodiments, the client device 120 may query or otherwise access the server 115 using a web application that loads into a web browser of the client device 120. The web application may be any server-side application that is developed with any website development tools and/or programming languages, such as PHP, Node.js, ASP.NET, CSS, JavaScript, and/or any other like technology that renders HTML.

Database 125 may be one or more hardware devices or systems for storing image data and/or video data, as well as information related to the stored image and/or video data. Database 125 may include one or more relational database management systems (RDBMS) one or more object database management systems (ODBMS), a column-oriented DBMS, correlation database DBMS, an extensible markup language (XML) format database, and the like. According to various embodiments, the databases may be stored on or otherwise associated with one or more data storage devices. These data storage devices may include at least one of a primary storage device, a secondary storage device, a tertiary storage device, a non-linear storage device, and/or other like data storage devices. In some embodiments, the databases may be associated with one or more systems or applications that enable querying of the databases and/or store information in the databases. Furthermore, the databases may include one or more virtual machines, such that the physical data storage devices containing the databases may be logically divided into multiple virtual data storage devices and/or databases. Alternatively, the databases may reside on one physical hardware data storage device. It should be noted that the database 125 may include one or more suitable systems and/or suitable applications for storing relevant information and providing the relevant information to one or more network devices in response to a database query. Any suitable database query language may be used to store and obtain information from database 125.

Although FIG. 1 shows one client device 120, a single server 115, and a single database 125, according to various embodiments, multiple client devices, multiple servers, and/or any number of databases may be present. Additionally, in some embodiments, client device 120, server 115, and database 125 may be virtual machines, and/or they may be provided as part of a cloud computing service. In various embodiments, client device 120, server 115, and database 125 may reside on one physical hardware device, and/or may be otherwise fully integrated with one another, such that, in various embodiments, one or more operations that are performed by server 115 may be performed by client device 120.

Figure 2:
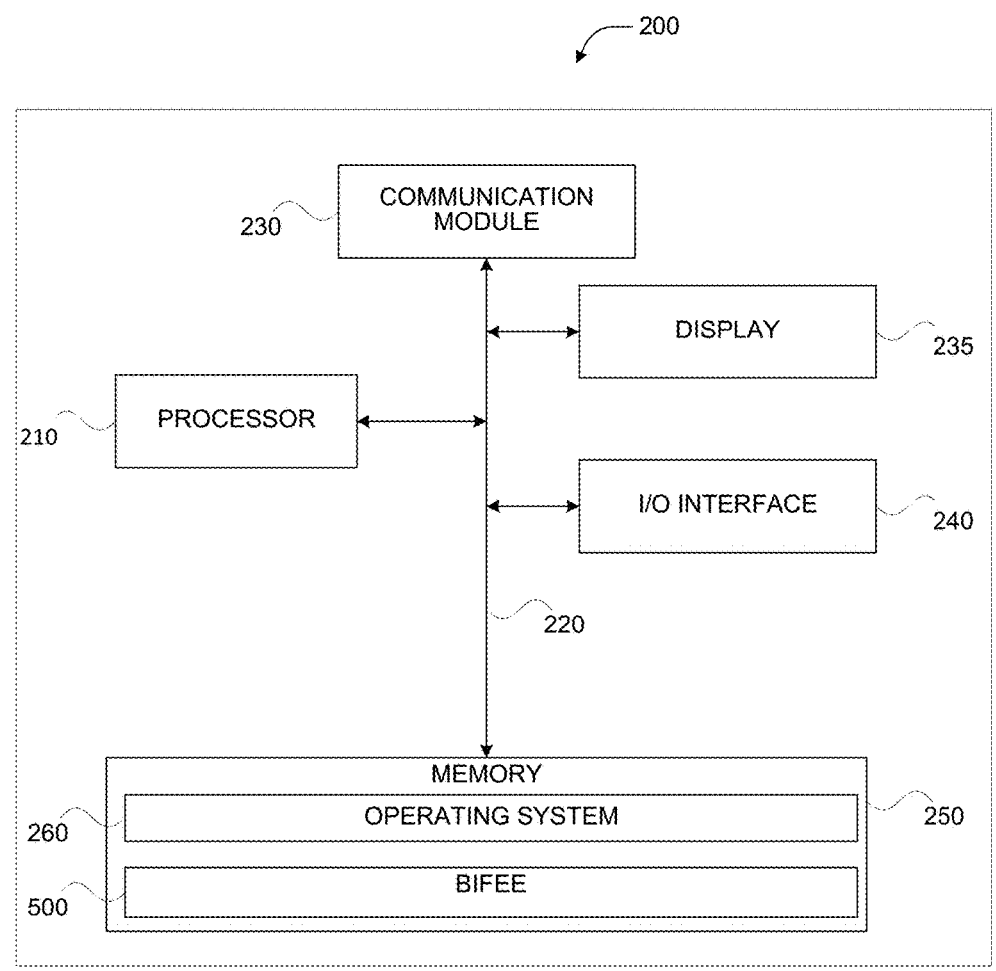
FIG. 2 illustrates the components of a computing device, in accordance with various example embodiments.

FIG. 2 illustrates the components of a computing device 200, in accordance with various example embodiments. The computing device 200 may correspond to server 115 and/or client device 120 as discussed previously with regard to FIG. 1. As shown, computing device 200 may include processor 210, memory 250, bus 220, communications module 230, input/output (I/O) interface 240, and display 235. In some embodiments, computing device 200 may include many more components than those shown in FIG. 2, such as an input device (e.g., a physical keyboard, a touch screen, etc.), and other like components. However, it is not necessary that all of these generally conventional components be shown in order to disclose the example embodiments.

Memory 250 may be a hardware device configured to store an operating system 260 and program code for one or more software components, such as BIFEE 500 and/or one or more other applications (not shown). Memory 250 may be a computer readable storage medium that generally includes a random access memory (RAM), read only memory (ROM), a flash memory device, a solid state disk (SSD), and/or other like storage media capable of storing and recording data. The program code and/or software components may also be loaded from a separate computer readable storage medium into memory 250 using a drive mechanism (not shown). Such separate computer readable storage medium may include a memory card, memory stick, removable flash drive, sim card, a secure digital (SD) card, and/or other like computer readable storage medium (not shown). In some embodiments, software components may be loaded into memory 250 via communications module 230, rather than via a computer readable storage medium.

During operation, memory 250 may include operating system 260, BIFEE 500, which includes wand duel initiation process 1400, wand duel commencement process 1500, and/or any other like processes (not shown). Operating system 460 may manage computer hardware and software resources and provide common services for computer programs. Operating system 260 may include one or more drivers that provide an interface to hardware devices thereby enabling operating system 260, BIFEE 500, and other applications to access hardware functions without needing to know the details of the hardware itself. The operating system 260 may be a general purpose operating system or an operating system specifically written for and tailored to the computing device 200. The BIFEE 500 may be a collection of software modules and/or program code that enables the computing device 200 to operate according to the various example embodiments as discussed with regard to FIGS. 3-7.

Processor 210 may be configured to carry out instructions of a computer program by performing the basic arithmetical, logical, and input/output operations of the system. The processor 210 may include a single-core processor, a dual-core processor, a triple-core processor, a quad-core processor, and the like. In embodiments where computing device 200 is to operate as a client device (e.g., client device 120), the processor 210 may also include a mobile video card and/or graphics processing unit (GPU), and/or the like. The processor 210 may perform a variety of functions for the computing device 200 and may process data by executing program code, one or more software modules, firmware, middleware, microcode, hardware description languages, and/or any other like set of instructions stored in the memory 250. The program code may be provided to processor 210 by memory 250 via bus 220, one or more drive mechanisms (not shown), and/or via communications module 230. In order to perform the variety of functions and data processing operations, the program code and/or software components may be executed by the processor 210. On execution by the processor 210, the processor 210 may cause computing device 200 to perform the various operations and functions delineated by the program code/modules, and/or software components.

For example, in various embodiments, the computing device 200 may include various modules configured to operate (through hardware and/or software) to obtain a source signal, image data, and/or video data (referred to generally as a "captured image"), generate a plurality of blocks from the captured image, wherein each block of the plurality of blocks is representative of a corresponding region of the captured image; extract a first feature (such as a vertebrate or retina feature) from at least one block of the plurality of blocks; determine a second feature (such as a fovea feature) based at least on the first feature; determine a third feature (such as an LGN feature) based on the second feature; determine, as a matching image, a stored image from among a plurality of stored images including an object that has greatest maximum correlation with the third feature; and perform various other functions according to the example embodiments disclosed herein. The various modules may include BIFEE 500, which may include the processes 500, 600, and 700 (described with regard to FIGS. 5, 6, and 7. respectively). The various modules may be loaded into memory 250 and executed by the processor 210. Once the various modules are loaded into memory 250 and executed by the processor 210, the processor 210 may be configured to perform the processes 500, 600, and/or 700 as discussed with regard to FIGS. 5-7. While specific modules are described herein, it should be recognized that, in various embodiments, various modules and/or processes may be combined, separated into separate modules and/or processes, and/or omitted. Additionally, in various embodiments, one or more modules and/or processes may be implemented on separate devices, in separate locations, or distributed, individually or in sets, across multiple processors, devices, locations, and/or in cloud-computing implementations.

Bus 220 may be configured to enable the communication and data transfer between the components of computing device 105. Bus 220 may comprise a high-speed serial bus, parallel bus, internal universal serial bus (USB), Front-Side-Bus (FSB), a PCI bus, a PCI-Express (PCI-e) bus, a Small Computer System Interface (SCSI) bus, and/or any other suitable communication technology for transferring data between components within computing device 200.

Communications module 230 may be a computer hardware component that connects computing device 105 to a computer network (e.g., network 115), such as one or more network interfaces, communications ports, and/or one or more transmitters/receivers (or alternatively one or more transceivers). The communications module 230 may be configured to operate in accordance with a wired communications protocol, such as a serial communications protocol (e.g., the USB, FireWire, SDI, and/or other like serial communications protocols), a parallel communications protocol (e.g., IEEE 1284, CAMAC, and/or other like parallel communications protocols), and/or a network communications protocol (e.g., Ethernet, token ring, (FDDI, and/or other like network communications protocols). Communications module 230 may operate in conjunction with a wireless transmitter/receiver and/or transceiver (not shown) that is configured to operate in accordance with one or more wireless standards. The wireless transmitter/receiver and/or transceiver may support communication in accordance with one or more wireless communications protocols and/or one or more cellular phone communications protocols, such as GSM, LTE, wideband code division multiple access (WCDMA), code division multiple access (CDMA), time division multiple access (TDMA), Bluetooth, Wi-Fi including IEEE 802.11a-p, Wi-MAX, and/or any other "wireless" communication protocols, including RF-based, optical, and so forth. The communications module 230 may also include one or more virtual network interfaces configured to operate with application 465 and/or other like applications. In some embodiments, the computing device 200 may obtain one or more images from one or more image capture devices 105 via the communications module 230.

I/O interface 240 may be a computer hardware component that provides communication between the computing device 200 and one or more other devices. The I/O interface 240 may include one or more user interfaces designed to enable user interaction with the computing device 200 and/or peripheral component interfaces designed to provide interaction between the computing device 200 and one or more peripheral components. Peripheral components may include, but are not limited to a physical keyboard or keypad, a touchpad, a speaker, a microphone, etc. Peripheral component interfaces may include, but are not limited to, a non-volatile memory port, a USB port, an audio jack, and a power supply interface. In some embodiments, one or more image capture devices 105 may be connected to the computing device 200 via the I/O interface 240. In such embodiments, the computing device 200 may obtain one or more images from one or more image capture devices 105 via the I/O interface 240.

Display 235 may be any type of output device that is able to present information in a visual form based on received electrical signals. Display 235 may be a light-emitting diode (LED) display device, an organic LED (OLED) display device, a liquid crystal display (LCD) device, a quantum dot display device, a projector device, and/or any other like display device. Furthermore, in various embodiments, the display device may be a touchscreen input device wherein a user may provide one or more inputs to the computing device 200 through one or more gestures by touching the display device with a stylus/pen and/or one or more fingers. The aforementioned display device technologies are generally well known, and a description of the functionality of the display 235 is omitted for brevity. However, it should be noted that, in various embodiments the display 235 may be separate from the computing device 200. In such embodiments the display 235 may be coupled with the computing device 200 by way of a wired connection, such as RCA connectors, a video graphics array (VGA) connector, a digital visual interface (DVI) connector and/or mini-DVI connector, a high-definition multimedia interface (HDMI) connector, an S-Video connector, and/or the like. Furthermore, the display 235 may be coupled with the computing device 200 via a wireless connection using one or more remote display protocols, such as the wireless gigabit alliance (WiGiG) protocol, the remote desktop protocol (RDP), PC-over-IP (PCoIP) protocol, the high-definition experience (HDX) protocol, and/or other like remote display protocols.

Figure 3:
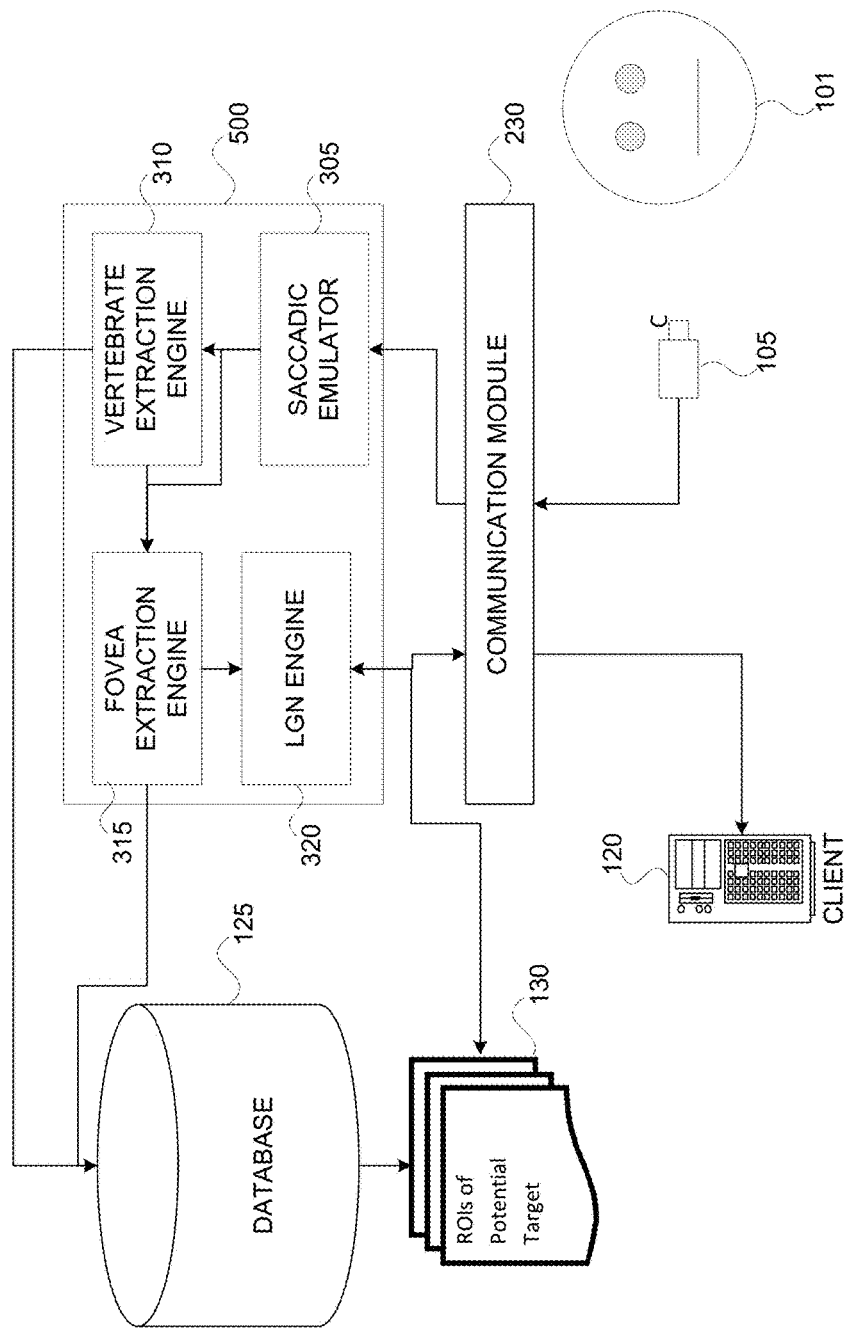
FIG. 3 illustrates example logical components and interaction points of various modules and devices, in accordance with various example embodiments.

FIG. 3 illustrates example logical components and interaction points of the BIFEE 500, in accordance with various embodiments. For illustrative purposes, the operations of the various modules shown by FIG. 3 will be described as being performed by the computing device 200 as described with respect to FIG. 2. One can view the following approach as a bio-inspired model which emulates the saccadic eye movement and a horizontal layer in the retina of a vertebrate. From this modeling, significant and salient shape features of one or more objects of interest in an image can be extracted. Although FIG. 3 shows logical interactions between various modules and/or devices, according to various embodiments, additional modules may be present and/or the aforementioned modules may be combined or divided into other logical components, or replaced by other devices and/or modules. According to various example embodiments, and with reference to FIGS. 1-2, the computing device 200 including the BIFEE 500 may operate as follows.

Database 125 may store images in association with other information. For example, the database 125 may store images that were previously captured by image capture devices 105. In embodiments, the images stored in the database 125 may be "raw images" that include several objects and environment/background features, some of which may include potential target objects. Additionally, at least some of the images stored in the database 125 may be "partial images" wherein a potential target object is cut off or obscured in the image by noise or other objects in the image. Furthermore, the database 125 may also store other image-related information. For example, in embodiments where the images stored in the database 125 are previously captured images, the image-related information may include a time stamp indicating a time at which the image was captured, geolocation information associated with the image capture device 105 that captured the image, and/or other like information.

The image capture device 105 may capture one or more images or video and/or generate image data or video data (collectively referred to as an "image" or "subject image") based on the captured images or video. The image capture device 105 may capture images based on instructions and/or queries from the client device 120 and/or the server 115, or the image capture device 105 may act autonomously with little or no operator intervention. The image capture device 105 may capture an image of subject 101, and generate image data that is representative of the subject 101. The image of the subject 101 may be a partial image of the subject 101, which may be for example, an image of only a portion of the subject's face. The image data may then be provided to the saccadic emulator 305 via the communication module 230. In some embodiments where the image capture device 105 is an optical-based image capture device, the image capture device 105 may compress and/or encode the image data prior to providing the image data to the saccadic emulator 305. In such embodiments, the computing device 200 may include a decoder (not shown) that performs various decoding and/or decompression operations and the decoded/decompressed image data may be provided to the saccadic emulator 305. In other embodiments, the image capture device 105 may provide raw video data or a raw video stream to the computing device 200, and in such embodiments, the saccadic emulator 305 may process the raw video data (e.g., as resizing, rotation, skewing, cropping, and/or the like) for saccadic eye emulation.

In some embodiments, the saccadic emulator 305 may obtain the image data via the I/O interface 240 (not shown) instead of through the communication module 230. In such embodiments a device interface module may obtain the image data from the image capture device 105 via the I/O interface 240, and provide the image data to the saccadic emulator 305 and/or other applications (not shown) for processing. The device interface module may be one or more software modules configured to interact with the various hardware components of the computing device 200. The device interface module and I/O interface 240 may be collectively referred to as "device interface circuitry." In embodiments, the device interface module 505 may control the image capture device 105 via the I/O interface 240 to adjust how the image capture device 105 obtains the image data, such as by performing zoom-in or zoom-out operations and the like. In some embodiments, such a device interface module may convert the received image data into a format that is usable by the saccadic emulator 305 in order for the saccadic emulator 305 to perform the saccadic eye emulation discussed herein.

The saccadic emulator 305 may be one or more software modules that operate in conjunction with one or more hardware devices to obtain the image data and perform a saccadic eye movement emulation to generate a plurality of blocks. Saccadic eye movement may include relatively quick movement of the eyes between at least two points of fixation or focus. The saccadic emulator 305 may emulate saccadic eye movement by focusing on blocks of the subject image where each block has different sample location (spatial location within the subject image). Each block may be the same size or each block may have different sizes. By taking different samples of the image based on the emulated saccadic eye movement, a set of sample data is obtained to enable a statistical technique to extract bio-inspired features of an object. For example, in some embodiments, the saccadic emulator 305 may perform the saccadic eye emulation by starting at a desired reference point within the subject image, and scanning the subject image according to one or more mathematical and/or biological models of saccadic eye movements. The reference point may be chosen randomly or based on the light and/or color intensity. From the scan, the saccadic emulator 305 generates a plurality of blocks based on different spatial locations of the subject image. For example, when an input image is obtained by saccadic emulator 305, saccadic emulator 305 acts like saccadic eye to generate several blocks of an object from which the statistical data can be constructed as shown in equation 1.

$$V = M(U) = [V_1 \ldots V_i \ldots V_n] \quad \text{[equation 1]}$$

In equation 1, V is a set of blocks, M is the saccadic emulator 305, U is the input image, $V_i$ is the emulated image or a block from the input image, and n is the total number of samples to be taken by the saccadic emulator 305. Each block is then provided to the vertebrate extraction engine 310 and the fovea extraction engine 315 to obtain vertebrate features and fovea features, respectively.

Vertebrate extraction engine 310 may be one or more software modules that operate in conjunction with one or more hardware devices to perform a Feature Extraction Algorithm (FEA) or a Principal Component Analysis (PCA) algorithm to extract one or more vertebrate features (also referred to as "retina features") from the set of blocks. The FEA or PCA technique maybe chosen according to various empirical studies or design choices. The vertebrate extraction engine 310 emulates retina horizontal cells, which are laterally interconnecting neurons in an inner nuclear layer of the retina of vertebrate eyes that help integrate and regulate the input from multiple photoreceptor cells and also allow vertebrate eyes to adjust to bright and dim light conditions. To emulate the retina horizontal cells, the vertebrate extraction engine 310 may extract low resolution features from the blocks. In this way, the vertebrate features may be representative of low resolution blocks of the one or more blocks obtained from the saccadic emulator 305. In some embodiments, the vertebrate features may be used to scan database images stored in database 125 in a blurry mode to detect objects of interest in the database images. Using FEA and/or PCA along with statistical data set from the saccadic emulator 305, low resolution vertebrate features may be extracted according to equation 2.

$$V_L = \text{FEA}(V) \quad \text{[equation 2]}$$

In equation 2, $V_L$ is the low resolution feature, FEA is the FEA or PCA technique, and V is a set of blocks from the saccadic emulator 305. The vertebrate features are then stored in the database 125 for future identification and also provided to the fovea extraction engine 315 for obtaining fovea features.

Fovea extraction engine 315 may be one or more software modules that operate in conjunction with one or more hardware devices to obtain the set of blocks from the saccadic emulator 305 and also obtain the vertebrate features from the vertebrate extraction engine 310, and obtain one or more fovea features from the set of blocks based on the vertebrate features. The fovea extraction engine 315 emulates the fovea region of the eye. The fovea region contains a group of closely packed cones and retinal ganglion cells, and is responsible for sharp central vision (also called foveal vision). In this way, the fovea features may be representative of high resolution blocks of the one or more blocks obtained from the saccadic emulator 305. In some embodiments, the fovea features may be used to confirm potential objects of interest from the retina features and/or the fovea features may be used to detect potential objects of interest. Using the vertebrate features from the vertebrate extraction engine 310, high resolution features may be extracted according to equation 3.

$$V_H = V_C - V_L \quad \text{[equation 3]}$$

In equation 3, $V_C$ is a closest central position of the saccadic position of the eye from the set of blocks V, $V_L$ is the low resolution feature from the vertebrate extraction engine 310, and $V_H$ is the high resolution feature. In some embodiments, the high resolution feature $V_H$ may be obtained by performing a local background suppression operation and a zoom-in operation on the retina features. The fovea features are then stored in the database 125 for future identification and also provided to the LGN engine 320 for obtaining LGN features.

Lateral geniculate nucleus (LGN) engine 320 may be one or more software modules that operate in conjunction with one or more hardware devices to perform another FEA and/or PCA algorithm to extract one or more LGN features from the fovea features provided by the fovea extraction engine 315. The FEA or PCA technique maybe chosen according to various empirical studies or design choices. The LGN engine 320 emulates the LGN of the visual pathway, which is a region in the thalamus that receives information directly from the retinal ganglion cells, parses retinal inputs, and provides time and spatially correlated signals to the visual cortex. In this way, the LGN features may be representative of low resolution features of the one or more fovea features obtained from the fovea extraction engine 315 for comparison with the images stored in the database 125. In various embodiments, the LGN engine 320 may perform a suitable downsampling operation and/or a suitable decimation operation on the fovea features to generate or otherwise obtain the LGN features.

Furthermore, the LGN engine 320 may determine a matching image from images stored in the database 125. In this way, the LGN features may be used to confirm potential objects of interest identified using the retina features and/or the fovea features. In this regard, the LGN engine 320 may obtain a set of the images stored in the database 125, determine regions of interest (ROIs) for potential objects 130 via the communications module 230, and determine a matching image from the set of stored images that includes an object having a greatest maximum correlation with the one or more LGN features from among the set of stored images. For example, an LGN feature $V_{LGN}$ may be defined according to equation 4.

$$V_{LGN}^{i,j} = \sum_{k=1}^{p} \sum_{l=1}^{q} V_H^{(i-1)p+k,(j-1)*q+l} - \frac{1}{MN} \sum_{i=1}^{N} \sum_{j=1}^{M} |V_H^{ij}| \quad \text{[equation 4]}$$

In equation 4, N and M are the height and width of the input image; and p and q are the window row and window column of the retina feature used to obtain the fovea feature. Based on equation 4, the matching image from the set of stored images may be obtained according to equation 5.

$$0 = \max(\Sigma_i f(V_{LGN,i}^T \aleph)) \quad \text{[equation 5]}$$

In equation 5, i=1:n, where n is the number of features to be used for a search, $\aleph$ is raw data or processed data stored in a database (e.g., database 125), and O is the final output to provide as a match via a linear or non-linear function f, wherein f may be a generic or neural network approximation function.

Once a matching image is obtained from the database 125, the LGN engine 320 may provide the matching image to client device 120 and (optionally) with other image-related information that is stored in association with the matching image.

Figure 4:
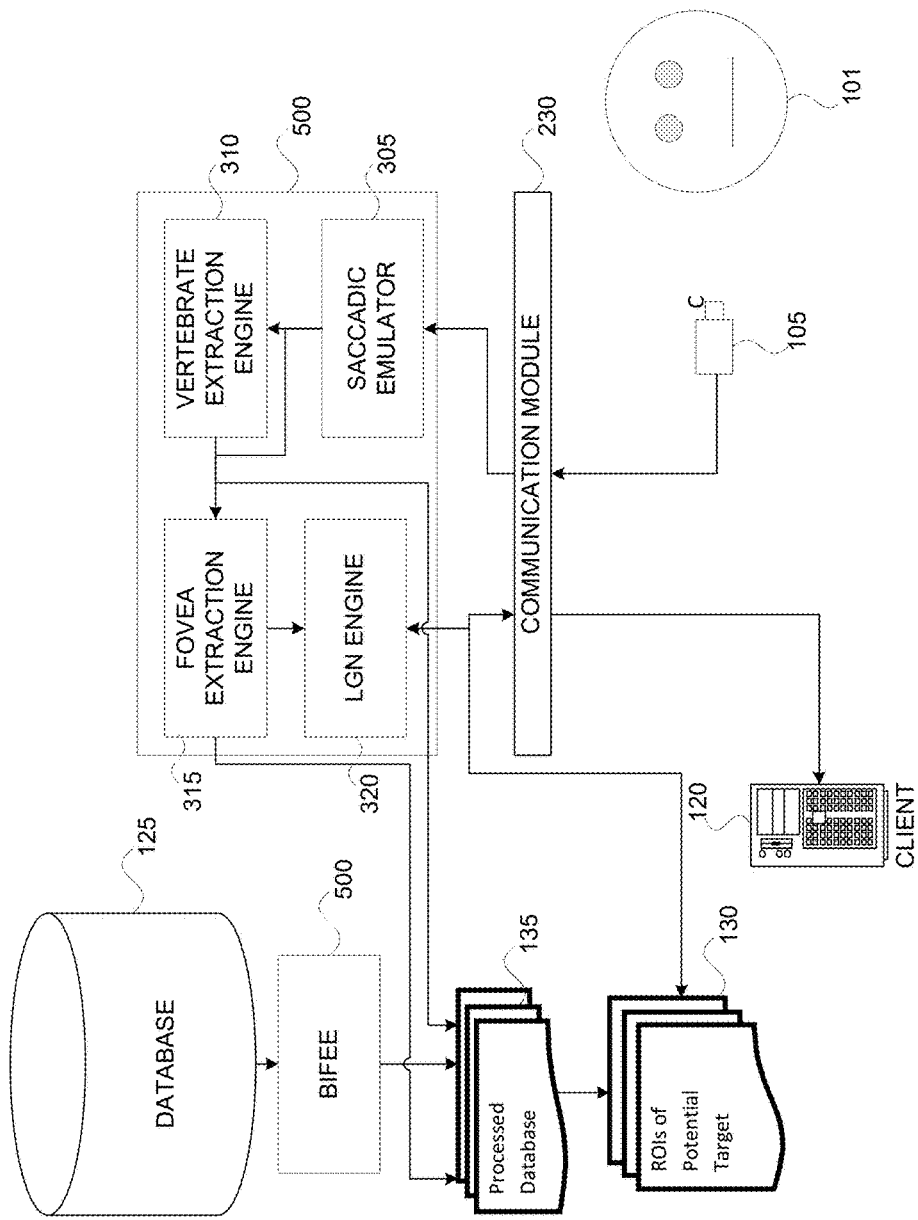
FIG. 4 illustrates example logical components and interaction points of various modules and devices, in accordance with other example embodiments.

FIG. 4 illustrates example logical components and interaction points of the BIFEE 500, in accordance with various other embodiments. For illustrative purposes, the operations of the various modules shown by FIG. 4 will be described as being performed by the computing device 200 as described with respect to FIG. 2. The various modules/devices shown by FIG. 4 may operate in a same or similar fashion as discussed previously with regard to FIG. 3. However, in the embodiments illustrated by FIG. 4, the database 125 may include processed image data instead of raw image data as discussed in the embodiments of FIG. 3. Although FIG. 4 shows logical interactions between various modules and/or devices, according to various embodiments, additional modules may be present and/or the aforementioned modules may be combined or divided into other logical components, or replaced by other devices and/or modules. According to various example embodiments, and with reference to FIGS. 1-2, the computing device 200 including the BIFEE 500 may operate as follows.

Database 125 may store images in association with other information. For example, the database 125 may store images that are obtained from another database of images, such as a database of driver's license photos, a database of images from a social networking service, and/or the like. Such images may be processed using the BIFEE 500 as described herein to obtain one or more vertebrate features, one or more fovea features, and one or more LGN features from such images. In embodiments, at least some of the images stored in the database 125 may be "partial images" wherein a potential target object is cutoff or obscured in the image by noise or other objects in the image. Furthermore, the database 125 may also store other image-related information if known. For example, in embodiments where the images stored in the database 125 are processed images obtained from another database, the image-related information may include personal identification information, demographic information, time stamp of the image, geolocation information associated with the image, and/or other like information.

Once the processed image data is further processed using the BIFEE 500, a database 135 of processed images may be generated. The processed database 135 may store the one or more vertebrate features, the one or more fovea features, and the one or more LGN features in association with each image. These vertebrate features, fovea features, and LGN features may be used to determine the ROIs of potential targets 130, which are then used for comparison with the LGN features obtained for a captured image as discussed with regard to FIG. 3.

Figure 5:
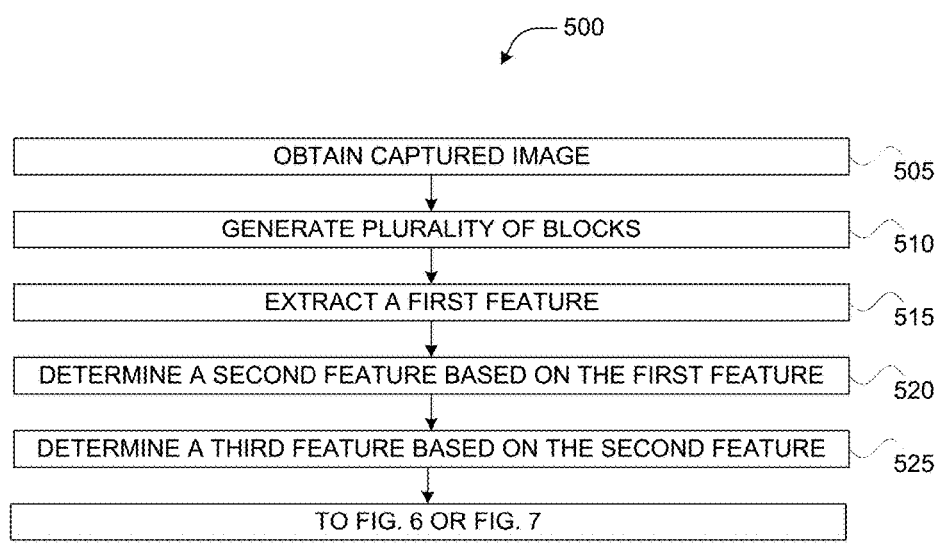
FIGS. 5-7 illustrate an example processes for a bio-inspired feature extraction engine (BIFEE) application, in accordance with various embodiments.
Figure 6:
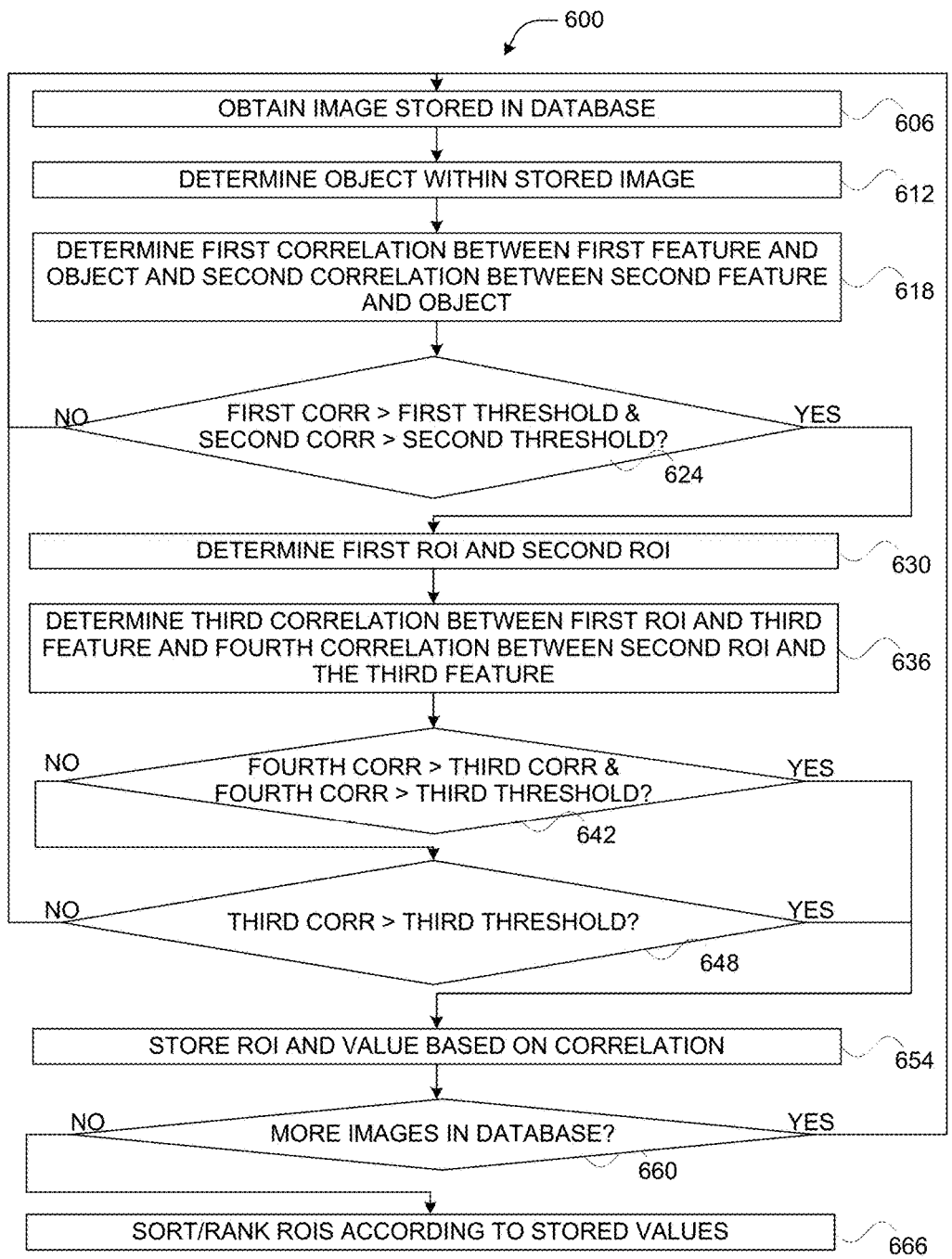
Figure 7:
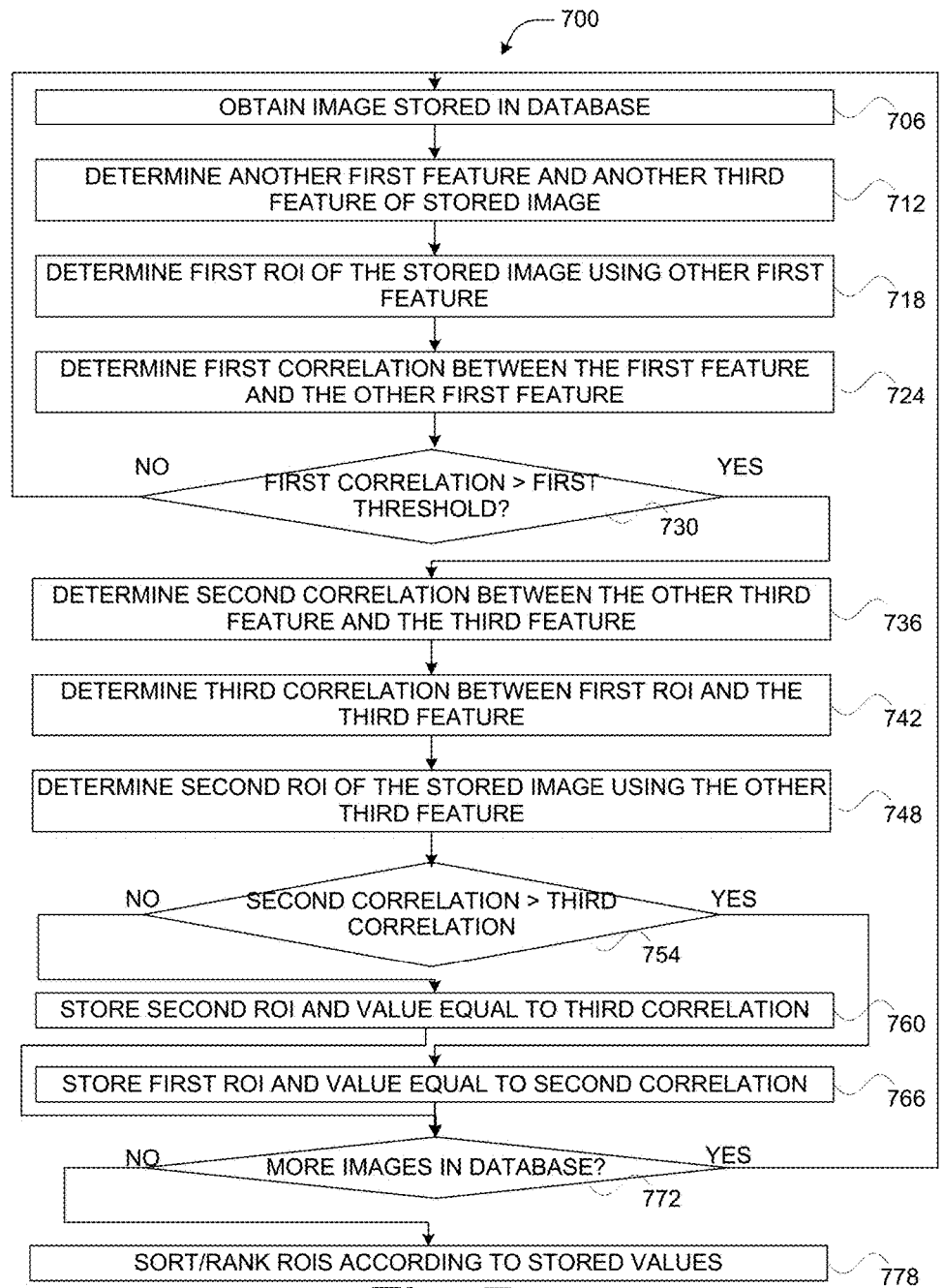

FIGS. 5-7 show flowcharts illustrating examplary processes 500-700 of the BIFEE 500, in accordance with various embodiments. According to various embodiments, the processes 500 and 600 of FIGS. 5-6 may be used for processing raw image data as discussed with regard to FIG. 3, while the processes 500 and 700 of FIGS. 5 and 7 may be used for processing processed image data. For illustrative purposes, the operations of process 500 will be described as being performed by the computing device 200 utilizing the various components and modules, as described with respect to FIGS. 3-4. However, it should be noted that other similar devices may operate the process 500-700 as described below. While particular examples and orders of operations are illustrated in FIGS. 5-7, in various embodiments, these operations may be re-ordered, broken into additional operations, combined, and/or omitted altogether.

Referring to FIG. 5, process 500 may start at operation 505, where the computing device 200 may obtain image data of a captured image from an image capture device 105. At operation 510, the computing device 200 may obtain a plurality of blocks from the image data. In embodiments, the saccadic emulator 305 of the BIFEE 500 may perform a saccadic eye movement emulation to generate the plurality of blocks. At operation 515, the computing device may extract a first feature from some or all of the plurality of blocks. In embodiments, the vertebrate extraction engine 310 of the BIFEE 500 may obtain one or more vertebrate features as the first feature using an FEA or PCA algorithm.

In various embodiments, a Dominant-Based PCA (DPCA) may be used, which may include using a dominant-element-based gradient descent and dynamic initial learning rate technique. In such embodiments, a stochastic sequential adaptive learning algorithm is selected and using an objective (energy) function shown by equation 6.

$$J(w) = \sum_{i=1}^{m} \Psi_i = \sum_{i=1}^{m} \sum_{t=1}^{k} |x_t - w_i w_i^T x_t|^2 \qquad [\text{equation 6}]$$

In equation 6, m is the number of principal components, k is the number of measurement vectors, $x_t$ is a measured vector at time t and $w_i$ is the $i^{th}$ principal vector (or eigenvector). From equation 6, equation 7 may be obtained.

$$J_i(w_i) = \sum_{t=1}^{k} |y_i^t - w_i w_i^T y_i^t|^2 \text{ wherein} \qquad [\text{equation 7}]$$

$$y_i^t = x_t - \sum_{j=1}^{i-1} w_j w_j^T x_t$$

From equation 7, the learning algorithm can be processed sequentially for each principal vector that is based on gradient descent according to equation 8.

$$\Delta w_{ij} = -\frac{\partial \Psi_i}{\partial w_{ij}} = -\frac{\partial \left( |y_i^t - w_i w_i^T y_i^t|^2 \right)}{\partial w_{ij}} \qquad [\text{equation 8}]$$

In equation 8, y is an objective function which consists of remained (in-extracted) components after removing the previous extracted components, and $\zeta = \zeta(i,j)$ is a learning rate. From equation 8, and when only a dominant element is used, an update of weights can be obtained according to equation 9.

$$w_{ij}^{new} = w_{ij}^{old} = \zeta \Delta w_{ij} w_{ij}^{old} + \zeta \varepsilon_{ij}(w_i^T y_i^t + w_{ij} y_{ij}^t) \qquad [\text{equation 9}]$$

where $$\zeta(i, j) = \frac{E_0}{E_{i-1}} \text{ and } \hat{y}_i^t = w_i w_i^T y_i^t,$$

where $E_0$ is the initial energy when the network starts learning and $E_{i-1}$ is the energy of the $(i-1)^{th}$ extracted principal vector.

At operation 520, the computing device 200 may determine a second feature based on the first feature. In various embodiments, the second feature may include one or more fovea features. In embodiments where saccadic eye movement emulation is used, the second feature may be determined based on the first feature and a block of the plurality of blocks that is a closest central position of the saccadic eye movement emulation. In some embodiments, the computing device 200 may perform a local background suppression operation and zoom-in operation on the first feature to determine the second feature.

At operation 525, the computing device 200 may determine a third feature based on the second feature. In various embodiments, the third feature may include one or more LGN features. In embodiments, perform a downsampling operation and/or a decimation operation on the second feature to generate or determine the third feature.

Once the third feature is determined, the computing device 200 may proceed to FIG. 6 for determining a matching image from a database 125 storing raw image data, or the computing device 200 may proceed to FIG. 7 for determining a matching image from a database 125 storing processed image data.

Referring to FIG. 6, at operation 606, the computing device 200 may obtain an image stored in the database 125. At operation 612, the computing device 200 may determine an object within the image obtained at operation 606. In embodiments, an FEA, a PCA, or any other suitable algorithm may be used to determine the object. At operation 618, the computing device 200 may determine a first correlation between the first feature obtained at operation 515 and the object and the computing device 200 may determine a second correlation between the second feature obtained at operation 520 and the object. For example, the first and second correlations may be determined using equations 10 and 11, respectively.

$$c_1 = \text{corr}(V_L^T, D_S^i) \quad \text{[equation 10]}$$

$$c_2 = \text{corr}(V_H^T, D_S^i) \quad \text{[equation 11]}$$

In equation 10, $C_1$ is the first correlation, corr is any suitable correlation function that yields a value indicative of a strength of association between two or more variables, $V_L$ is the first feature (e.g., the vertebrate feature) obtained at operation 515, and $D_S$ is the object detected in the stored image. In equation 11, $C_2$ is the second correlation, corr is the same or similar correlation function used in equation 10, $V_H$ is the second feature (e.g., the fovea feature) obtained at operation 520, and $D_S$ is the object detected in the stored image.

At operation 624, the computing device 200 may determine whether the first correlation is greater than a first threshold and whether the second correlation is greater than a second threshold. The first threshold and the second threshold may be chosen according to various design choices or empirical studies. If at operation 624, the computing device 200 determines that the first correlation is not greater than the first threshold and/or that the second correlation is not greater than the second threshold, then the computing device 200 may proceed to operation 606 to obtain the next stored image. If at operation 624, the computing device 200 determines that the first correlation is greater than the first threshold and that the second correlation is greater than the second threshold, then the computing device 200 may proceed to operation 630 to determine a first ROI and a second ROI associated with the object.

At operation 630, the computing device 200 may determine a first ROI and a second ROI associated with the object. The first ROI and/or the second ROI may be a subset of samples used to determine the object, such as a polygon or borders surrounding the object. At operation 636, the computing device 200 may determine a third correlation between the first ROI and the third feature (e.g., the LGN feature) obtained at operation 525 and the computing device 200 may determine a fourth correlation between the second ROI and the third feature (e.g., the LGN feature) obtained at operation 525. In some embodiments, the third and fourth correlations may be maximum correlations. For example, the third and fourth correlations may be determined using equations 12 and 13, respectively.

$$c_3 = \max \text{corr}(\text{ROI}_1, V_{LGN}) \quad \text{[equation 12]}$$

$$c_4 = \max \text{corr}(\text{ROI}_2, V_{LGN}) \quad \text{[equation 13]}$$

In equation 12, $C_3$ is the third correlation, max corr is any suitable correlation function that yields a value indicative of a maximum or greatest correlation between two or more variables, $V_{LGN}$ is the third feature (e.g., the LGN feature) obtained at operation 525, and $\text{ROI}_1$ is the first ROI. In equation 13, $C_4$ is the fourth correlation, max corr is the same or similar maximum correlation function used in equation 12, $V_{LGN}$ is the third feature (e.g., the LGN feature) obtained at operation 525, and $\text{ROI}_2$ is the second ROI.

At operation 642, the computing device 200 may determine whether the fourth correlation is greater than the third correlation and whether the fourth correlation is greater than a third threshold. The third threshold may be chosen according to various design choices or empirical studies. If at operation 642, the computing device 200 determines that the fourth correlation is greater than the third correlation and that the fourth correlation is greater than the third threshold, then the computing device 200 may proceed to operation 654 to store a value equal to the fourth correlation in association with the first ROI.

If at operation 642, the computing device 200 determines that the fourth correlation is not greater than the fourth threshold and/or that the fourth correlation is not greater than the third threshold, then the computing device 200 may proceed to operation 648 to determine whether the third correlation is greater than the third threshold.

At operation 648, the computing device 200 may determine whether the third correlation is greater than the third threshold. If at operation 648, the computing device 200 determines that the third correlation is not greater than the third threshold, then the computing device 200 may proceed to operation 606 to obtain a next stored image. If at operation 648, the computing device 200 determines that the third correlation is greater than the third threshold, then the computing device 200 may proceed to operation 654 to store a value equal to the third correlation in association with the second ROI.

At operation 660, the computing device 200 may determine whether there are any more stored images to be processed, and if so, the computing device 200 may proceed to operation 606 to obtain a next stored image. Otherwise, the computing device 200 may proceed to operation 666 to sort and/or rank the ROIs according to their associated values, which may be the values stored for each image at operation 654.

Referring back to FIG. 5, once the third feature is determined at operation 525, the computing device 200 may proceed to FIG. 7 for determining a matching image from a database 125 storing processed image data.

Referring to FIG. 7, at operation 706, the computing device 200 may obtain an image stored in the database 125. At operation 712, the computing device 200 may determine another first feature and another third feature of the image obtained at operation 706. The other first feature may be a vertebrate feature of the stored image and the other third feature may be an LGN feature of the stored image, which may be extracted from the stored image in a same or similar manner as discussed previously with regard to the vertebrate and LGN features. At operation 718, the computing device 200 may determine a first ROI of the stored image using the other first feature. In some embodiments, the first ROI may be a boundary or polygon surrounding the other first feature.

At operation 724, the computing device 200 may determine a first correlation between the first feature determined at operation 515 and the other first feature. For example, the first correlation may be determined using equation 14.

$$c_1 = \text{corr}(V_L^T, D_{EL}^i) \qquad [\text{equation 14}]$$

In equation 14, $c_i$ is the first correlation, corr is any suitable correlation function that yields a value indicative of a strength of association between two or more variables, $V_L$ is the first feature (e.g., the vertebrate feature) obtained at operation 515, and $D_{EL}$ is the other first feature of the stored image.

At operation 730, the computing device 200 may determine whether the first correlation is greater than the first threshold. The first threshold may be chosen according to various design choices or empirical studies. If at operation 730, the computing device 200 determines that the first correlation is not greater than the first threshold, then the computing device 200 may proceed to operation 706 to obtain the next stored image. If at operation 730, the computing device 200 determines that the first correlation is greater than the first threshold, then the computing device 200 may proceed to operation 736 to determine a second correlation between the third feature determined at operation 525 and the other third feature determined at operation 712.

At operation 736, the computing device 200 determine a second correlation between the third feature determined at operation 525 and the other third feature determined at operation 712. In some embodiments, the second correlation may be a maximum correlation. For example, the second correlation may be obtained using equation 15.

$$c_2 = \max \text{corr}(D_{ELGN}, V_{LGN}) \qquad [\text{equation 15}]$$

In equation 15, $C_2$ is the second correlation, max corr is any suitable correlation function that yields a value indicative of a maximum or greatest correlation between two or more variables, $V_{LGN}$ is the third feature (e.g., the LGN feature) obtained at operation 525, and $D_{ELGN}$ is the other third feature determined at operation 712.

At operation 742, the computing device 200 may determine a third correlation between the first ROI and the third feature (e.g., the LGN feature) obtained at operation 525. In some embodiments, the third correlation may be a maximum correlation. For example, the third correlation may be determined using equation 16.

$$c_3 = \max \text{corr}(\text{ROI}_1, V_{LGN}) \qquad [\text{equation 16}]$$

In equation 16, $C_3$ is the third correlation, max corr is any suitable correlation function that yields a value indicative of a maximum or greatest correlation between two or more variables, $V_{LGN}$ is the third feature (e.g., the LGN feature) obtained at operation 525, and $\text{ROI}_1$ is the first ROI.

At operation 748, the computing device 200 may determine a second ROI of the stored image using the other third feature. In some embodiments, the second ROI may be a boundary or polygon surrounding the other third feature.

At operation 754, the computing device 200 may determine whether the second correlation is greater than the third correlation. If at operation 754, the computing device 200 determines that the third correlation is greater than the third correlation, then the computing device 200 may proceed to operation 766 to store a first value equal to the second correlation in association with the first ROI. If at operation 754, the computing device 200 determines that the third correlation is not greater than the third correlation, then the computing device 200 may proceed to operation 760 to store a second value equal to the third correlation in association with the second ROI.

From operation 760 or 766, the computing device 200 may proceed to operation 772 to determine whether there are any more stored images to be processed, and if so, the computing device 200 may proceed to operation 706 to obtain a next stored image. Otherwise, the computing device 200 may proceed to operation 778 to sort and/or rank the ROIs according to their associated values, which may be the values stored for each image at operation 760 and/or operation 766.

Some non-limiting Examples are provided below.

Example 1 may include one or more computer-readable media having instructions that, when executed, cause a computing device to: generate a plurality of blocks from a captured image, wherein each block of the plurality of blocks is representative of a corresponding region of the captured image; extract a first feature from at least one block of the plurality of blocks; determine a second feature based at least on the first feature; determine a third feature based on the second feature; and determine, as a matching image, a stored image from among a plurality of stored images including an object that has greatest maximum correlation with the third feature. The one or more computer-readable media may be non-transitory computer-readable media.

Example 2 may include the one or more computer-readable media of example 1 and/or some other examples herein, wherein the first feature is a low resolution feature, the second feature is a high resolution feature, and the third feature is a low resolution version of the second feature.

Example 3 may include the one or more computer-readable media of example 1 and/or some other examples herein, wherein the plurality of blocks are obtained based on a saccadic eye movement emulation, and wherein the second feature is determined based on the first feature and a block of the plurality of blocks that is a closest central position of the saccadic eye movement emulation.

Example 4 may include the one or more computer-readable media of example 1 and/or some other examples herein, wherein, to determine the second feature, the instructions further cause the computing device, in response to execution of the instructions by the computing device, to: perform a local background suppression and zoom-in operation on the first feature.

Example 5 may include the one or more computer-readable media of example 1 and/or some other examples herein, wherein, to determine the third feature from the second feature, the instructions further cause the computing device, in response to execution of the instructions by the computing device, to: perform a downsampling operation or a decimation operation on the second feature to generate the third feature.

Example 6 may include the one or more computer-readable media of example 1 and/or some other examples herein, wherein the instructions further cause the computing device, in response to execution of the instructions by the computing device, to: obtain the plurality of stored images from a database using the first feature and the second feature, and for each image of the plurality of images from the database, determine whether an image of the plurality of stored images has a correlated object, the correlated object being an object having a first maximum correlation between the first feature and the object that is greater than a first threshold and a second maximum correlation between the second feature and the object that is greater than a second threshold, determine a first region of interest (ROI) of the correlated object for the first feature and a second ROI of the correlated object for the second feature, determine a third maximum correlation between the third feature and the first ROI and a fourth maximum correlation between the third feature and the second ROI, store, in the database, the first ROI in association with a value equal to the fourth maximum correlation when the fourth maximum correlation is greater than the third maximum correlation and the fourth maximum correlation is greater than a third threshold, or store the second ROI in association with the value that is equal to the third maximum correlation when the fourth maximum correlation is less than the third maximum correlation and third maximum correlation is greater than the third threshold, and wherein to determine the matching image, the instructions cause the computing device to determine an image from the database stored in association with a greatest value.

Example 7 may include the one or more computer-readable media of example 1 and/or some other examples herein, wherein the instructions further cause the computing device, in response to execution of the instructions by the computing device, to: obtain the plurality of stored images from a database using the first feature and the second feature, and for each image of the plurality of images from the database, determine another first feature for an image of the plurality of stored images and another third feature for the image of the plurality of images, determine a first ROI of the image of the plurality of stored images using the other first feature, determine a first maximum correlation between the other first feature and an object within the image of the plurality of stored images, when the first maximum correlation is greater than a first threshold, determine a second maximum between the other third feature and the third feature and a third maximum correlation between the first ROI and the third feature, determine a second ROI of the image of the plurality of stored images using the other third feature, and when the second maximum correlation is greater than the third maximum correlation, store, in the database, the second ROI in association with a value, wherein the value is equal to the second maximum correlation, when the second maximum correlation is less than the third maximum correlation, store, in the database, the first ROI in association with the value, wherein the value is equal to the third maximum correlation, and wherein to determine the matching image, the instructions cause the computing device to determine an image from the database stored in association with a greatest value.

Example 8 may include the one or more computer-readable media of examples 6 and 7 and/or some other examples herein, wherein the instructions further cause the computing device, in response to execution of the instructions by the computing device, to: determine one or more shape features of the first ROI and the second ROI using a feature extraction algorithm (FEA) or using a dominant based principal component analysis (DPCA).

Example 9 may include the one or more computer-readable media of example 1 and/or some other examples herein, wherein the first feature is extracted using an FEA or DPCA.

Example 10 may include the one or more computer-readable media of examples 1-9 and/or some other examples herein, wherein the first feature is a vertebrate feature, the second feature is a fovea feature, and the third feature is a lateral geniculate nucleus (LGN) feature.

Example 11 may include a computing device comprising: at least one processor; a saccadic emulator to be operated by the at least one processor to generate, from an obtained image, one or more blocks, wherein each block of the one or more blocks is representative of a region of the obtained image; a vertebrate extraction engine to be operated by the at least one processor to extract one or more vertebrate features from the one or more blocks, wherein the one or more vertebrate features are representative of low resolution blocks of the one or more blocks; a fovea extraction engine to be operated by the at least one processor to extract one or more fovea features from the one or more blocks, wherein the one or more fovea features are representative of high resolution blocks of the one or more blocks; and a lateral geniculate nucleus (LGN) engine to be operated by the at least one processor to extract one or more LGN features based on the one or more fovea features; and determine, as a matching image, a stored image from among a plurality of stored images including an object that has greatest maximum correlation with the one or more LGN feature from among a set of stored images.

Example 12 may include the computing device of example 11 and/or some other examples herein, wherein the one or more vertebrate features are extracted using a feature extraction algorithm (FEA) or using a dominant based principal component analysis (DPCA).

Example 13 may include the computing device of example 11 and/or some other examples herein, wherein the saccadic emulator is to emulate saccadic eye movements to generate the plurality of blocks, and wherein the one or more fovea features are determined based on the one or more vertebrate features and a block of the plurality of blocks that is a closest central position of the saccadic eye movements of the emulation.

Example 14 may include the computing device of example 11 and/or some other examples herein, wherein, to determine the one or more fovea features, the fovea extraction engine is to perform a local background suppression and zoom-in operation on each of the one or more vertebrate features.

Example 15 may include the computing device example 11 and/or some other examples herein, wherein, to determine the one or more LGN features from the one or more fovea features, the LGN engine is to perform a downsampling operation or a decimation operation on each of the one or more fovea features to generate each of the one or more LGN features.

Example 16 may include the computing device of example 11 and/or some other examples herein, wherein the LGN engine is further to: obtain the plurality of stored images from a database using the first feature and the second feature, and for each image of the plurality of images from the database, determine whether an image of the plurality of stored images has a correlated object, the correlated object being an object having a first maximum correlation between the first feature and the object that is greater than a first threshold and a second maximum correlation between the second feature and the object that is greater than a second threshold, determine a first region of interest (ROI) of the correlated object for the first feature and a second ROI of the correlated object for the second feature, determine a third maximum correlation between the third feature and the first ROI and a fourth maximum correlation between the third feature and the second ROI, store, in the database, the first ROI in association with a value equal to the third maximum correlation when the fourth maximum correlation is greater than the third maximum correlation and the fourth maximum correlation is greater than a third threshold, or store the second ROI in association with the value that is equal to the third maximum correlation when the fourth maximum correlation is less than the third maximum correlation and the third maximum correlation is greater than the third threshold, and wherein to determine the matching image, the LGN engine is to determine an image from the database stored in association with a greatest value.

Example 17 may include the computing device of example 11 and/or some other examples herein, wherein the LGN engine is to: obtain the plurality of stored images from a database using the first feature and the second feature, and for each image of the plurality of images from the database, determine another first feature for an image of the plurality of stored images and another third feature for the image of the plurality of images, determine a first ROI of the image of the plurality of stored images using the other first feature, determine a first maximum correlation between the other first feature and an object within the image of the plurality of stored images, when the first maximum correlation is greater than a first threshold, determine a second maximum between the other third feature and the third feature and a third maximum correlation between the first ROI and the third feature, determine a second ROI of the image of the plurality of stored images using the other third feature, and when the second maximum correlation is greater than the third maximum correlation, store, in the database, the second ROI in association with a value, wherein the value is equal to the second maximum correlation, when the second maximum correlation is less than the third maximum correlation, store, in the database, the first ROI in association with the value, wherein the value is equal to the third maximum correlation, and wherein to determine the matching image, the LGN engine is to determine an image from the database stored in association with a greatest value.

Example 18 may include the computing device of examples 16 and 17 and/or some other examples herein, wherein the LGN engine is to: determine one or more shape features of the first ROI and the second ROI using a feature extraction algorithm (FEA) or using a dominant based principal component analysis (DPCA).

Example 19 may include the computing device of example 11 and/or some other examples herein, further comprising: a communication module; and device interface circuitry, wherein the image is to be obtained via one of the communication module or the device interface circuitry.

Example 20 may include a computer-implemented method comprising: generating, by a computing device, a plurality of blocks from a captured image, wherein each block of the plurality of blocks is representative of a corresponding region of the captured image; extracting, by the computing device, a first feature from at least one block of the plurality of blocks; determining, by the computing device, a second feature based at least on the first feature; determining, by the computing device, a third feature based on the second feature; and determining, by the computing device, as a matching image, a stored image from among a plurality of stored images including an object that has greatest maximum correlation with the third feature.

Example 21 may include the method of example 20 and/or some other examples herein, wherein the first feature is a low resolution feature, the second feature is a high resolution feature, and the third feature is a low resolution version of the second feature.

Example 22 may include the method of example 20 and/or some other examples herein, wherein the plurality of blocks are obtained based on a saccadic eye movement emulation, and wherein the second feature is determined based on the first feature and a block of the plurality of blocks that is a closest central position of the saccadic eye movement emulation.

Example 23 may include the method of example 20 and/or some other examples herein, further comprising: performing, by the computing device, a local background suppression and zoom-in operation on the first feature.

Example 24 may include the method of example 20 and/or some other examples herein, wherein determining the third feature from the second feature comprises: performing, by the computing device, a downsampling operation or a decimation operation on the second feature to generate the third feature.

Example 25 may include the method of example 20 and/or some other examples herein, further comprising: obtaining, by the computing device, the plurality of stored images from a database using the first feature and the second feature, and for each image of the plurality of images from the database, determining, by the computing device, whether an image of the plurality of stored images has a correlated object, the correlated object being an object having a first maximum correlation between the first feature and the object that is greater than a first threshold and a second maximum correlation between the second feature and the object that is greater than a second threshold, determining, by the computing device, a first region of interest (ROI) of the correlated object for the first feature and a second ROI of the correlated object for the second feature, determining, by the computing device, a third maximum correlation between the third feature and the first ROI and a fourth maximum correlation between the third feature and the second ROI, storing or causing to store, by the computing device, in the database, the first ROI in association with a value equal to the fourth maximum correlation when the fourth maximum correlation is greater than the third maximum correlation and the fourth maximum correlation is greater than a third threshold, or storing or causing to store, by the computing device, the second ROI in association with the value that is equal to the third maximum correlation when the fourth maximum correlation is less than the third maximum correlation and the third maximum correlation is greater than the third threshold, and wherein determining the matching image comprises determining, by the computing device, an image from the database stored in association with a greatest value.

Example 26 may include the method of example 20 and/or some other examples herein, further comprising: obtaining, by the computing device, the plurality of stored images from a database using the first feature and the second feature, and for each image of the plurality of images from the database, determining, by the computing device, another first feature for an image of the plurality of stored images and another third feature for the image of the plurality of images, determining, by the computing device, a first ROI of the image of the plurality of stored images using the other first feature, determining, by the computing device, a first maximum correlation between the other first feature and an object within the image of the plurality of stored images, when the first maximum correlation is greater than a first threshold, determining, by the computing device, a second maximum between the other third feature and the third feature and a third maximum correlation between the first ROI and the third feature, determining, by the computing device, a second ROI of the image of the plurality of stored images using the other third feature, and when the second maximum correlation is greater than the third maximum correlation, storing, by the computing device in the database, the second ROI in association with a value, wherein the value is equal to the second maximum correlation, when the second maximum correlation is less than the third maximum correlation, storing, by the computing device in the database, the first ROI in association with the value, wherein the value is equal to the third maximum correlation, and wherein to determine the matching image, the instructions cause the computing device to determine an image from the database stored in association with a greatest value.

Example 27 may include the method of examples 25 and 26 and/or some other examples herein, wherein the instructions further cause the computing device, in response to execution of the instructions by the computing device, to: determining, by the computing device, one or more shape features of the first ROI and the second ROI using a feature extraction algorithm (FEA) or using a dominant based principal component analysis (DPCA).

Example 28 may include the method of example 20 and/or some other examples herein, wherein the first feature is extracted using an FEA or DPCA.

Example 29 may include the method of examples 20-28 and/or some other examples herein, wherein the first feature is a vertebrate feature, the second feature is a fovea feature, and the third feature is a lateral geniculate nucleus (LGN) feature.

Example 30 may include at least one computer-readable medium including instructions that, when executed by one or more processors of a computing device, cause the computing device to execute the method of any one of examples 20-29 and/or some other examples herein.

Example 31 may include a computing device comprising: saccadic emulation means for generating, from an obtained image, one or more blocks, wherein each block of the one or more blocks is representative of a region of the obtained image; vertebrate extraction means for extracting one or more vertebrate features from the one or more blocks, wherein the one or more vertebrate features are representative of low resolution blocks of the one or more blocks; fovea extraction means for extracting one or more fovea features from the one or more blocks, wherein the one or more fovea features are representative of high resolution blocks of the one or more blocks; and lateral geniculate nucleus (LGN) means for extracting one or more LGN features based on the one or more fovea features; and determine, as a matching image, a stored image from among a plurality of stored images including an object that has greatest maximum correlation with the one or more LGN feature from among a set of stored images.

Example 32 may include the computing device of example 31 and/or some other examples herein, wherein the one or more vertebrate features are extracted using a feature extraction algorithm (FEA) or using a dominant based principal component analysis (DPCA).

Example 33 may include the computing device of example 31 and/or some other examples herein, wherein the saccadic emulation means is for emulating saccadic eye movements to generate the plurality of blocks, and wherein the one or more fovea features are determined based on the one or more vertebrate features and a block of the plurality of blocks that is a closest central position of the saccadic eye movements of the emulation.

Example 34 may include the computing device of example 31 and/or some other examples herein, wherein the fovea extraction means is to determine the one or more fovea features by performing a local background suppression and zoom-in operation on each of the one or more vertebrate features.

Example 35 may include the computing device example 31 and/or some other examples herein, wherein the LGN engine is to determine the one or more LGN features from the one or more fovea features by performing a downsampling operation or a decimation operation on each of the one or more fovea features to generate each of the one or more LGN features.

Example 36 may include the computing device of example 31 and/or some other examples herein, wherein the LGN means is further for: obtaining the plurality of stored images from a database using the first feature and the second feature, and for each image of the plurality of images from the database, determining whether an image of the plurality of stored images has a correlated object, the correlated object being an object having a first maximum correlation between the first feature and the object that is greater than a first threshold and a second maximum correlation between the second feature and the object that is greater than a second threshold, determining a first region of interest (ROI) of the correlated object for the first feature and a second ROI of the correlated object for the second feature, determining a third maximum correlation between the third feature and the first ROI and a fourth maximum correlation between the third feature and the second ROI, storing, in the database, the first ROI in association with a value equal to the third maximum correlation when the fourth maximum correlation is greater than the third maximum correlation and the fourth maximum correlation is greater than a third threshold, or storing the second ROI in association with the value that is equal to the third maximum correlation when the fourth maximum correlation is less than the third maximum correlation and the third maximum correlation is greater than the third threshold, and wherein the LGN means is to determine the matching image by determining an image from the database stored in association with a greatest value.

Example 37 may include the computing device of example 31 and/or some other examples herein, wherein the LGN means is further for: obtaining the plurality of stored images from a database using the first feature and the second feature, and for each image of the plurality of images from the database, determining another first feature for an image of the plurality of stored images and another third feature for the image of the plurality of images, determining a first ROI of the image of the plurality of stored images using the other first feature, determining a first maximum correlation between the other first feature and an object within the image of the plurality of stored images, when the first maximum correlation is greater than a first threshold, determining a second maximum between the other third feature and the third feature and a third maximum correlation between the first ROI and the third feature, determining a second ROI of the image of the plurality of stored images using the other third feature, and when the second maximum correlation is greater than the third maximum correlation, storing, in the database, the second ROI in association with a value, wherein the value is equal to the second maximum correlation, when the second maximum correlation is less than the third maximum correlation, storing, in the database, the first ROI in association with the value, wherein the value is equal to the third maximum correlation, and wherein the LGN means is to determine the matching image by determining an image from the database stored in association with a greatest value.

Example 38 may include the computing device of examples 36 and 37 and/or some other examples herein, wherein the LGN means is further for: determining one or more shape features of the first ROI and the second ROI using a feature extraction algorithm (FEA) or using a dominant based principal component analysis (DPCA).

Example 39 may include the computing device of example 31 and/or some other examples herein, further comprising: communication means; and device interface means, wherein one of the communication means and the device interface means is for obtaining the image.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

We claim:

1. A computing device comprising:
   memory circuitry configured to store program code of a saccadic emulator, a vertebrate extraction engine, a fovea extraction engine, and a lateral geniculate nucleus (LGN) engine; and
   processor circuitry coupled with the memory circuitry, the processor circuitry configured to:
     operate the saccadic emulator to:
       perform a saccadic eye movement emulation on an obtained image, and
       generate, based on the saccadic eye movement emulation one or more blocks from the obtained image, wherein each block of the one or more blocks is representative of a region of the obtained image;
     operate the vertebrate extraction engine to extract one or more vertebrate features from the one or more blocks using a principle component analysis (PCA) of each of the one or more blocks, wherein the one or more vertebrate features are representative of low resolution blocks of the one or more blocks;
     operate the fovea extraction engine to extract one or more fovea features from the one or more blocks based on a difference between a central position of a saccadic position of an eye of the saccadic eye movement emulation and the one or more vertebrate features, wherein the one or more fovea features are representative of high resolution blocks of the one or more blocks; and
     operate the lateral geniculate nucleus (LGN) engine to:
       extract one or more LGN features based on the one or more fovea features, wherein the one or more LGN features comprise low resolution portions of the one or more fovea features; and
       determine, as a matching image, a stored image from among a plurality of stored images including an object that has greatest maximum correlation with the one or more LGN feature from among a set of stored images.

2. The computing device of claim 1, wherein the processor circuitry is configured to operate the vertebrate extraction engine to extract the one or more vertebrate features using a feature extraction algorithm (FEA) or using a dominant based principal component analysis (DPCA).

3. The computing device of claim 1, wherein the processor circuitry is configured to operate the saccadic emulator to emulate saccadic eye movements to generate the plurality of blocks, and wherein the one or more fovea features are determined based on the one or more vertebrate features and a block of the plurality of blocks that is a closest central position of the saccadic eye movements of the emulation.

4. The computing device of claim 1, wherein, to determine the one or more fovea features, the processor circuitry is configured to operate the fovea extraction engine to perform a local background suppression and zoom-in operation on each of the one or more vertebrate features.

5. The computing device claim 1, wherein, to determine the one or more LGN features from the one or more fovea features, the processor circuitry is configured to operate the LGN engine to perform a downsampling operation or a decimation operation on each of the one or more fovea features to generate each of the one or more LGN features.

6. The computing device of claim 1, wherein the processor circuitry is configured to operate the LGN engine to:
   obtain the plurality of stored images from a database using the one or more vertebrate features and the one or more fovea features, and for each image of the plurality of images from the database,
     determine whether an image of the plurality of stored images has a correlated object, the correlated object being an object having a first maximum correlation between the one or more vertebrate features and the object that is greater than a first threshold and a second maximum correlation between the one or more fovea features and the object that is greater than a second threshold,
     determine a first region of interest (ROI) of the correlated object for the one or more vertebrate features and a second ROI of the correlated object for the one or more fovea features,
     determine a third maximum correlation between the one or more LGN features and the first ROI and a fourth maximum correlation between the one or more LGN features and the second ROI,
     store, in the database, the first ROI in association with a value equal to the third maximum correlation when the fourth maximum correlation is greater than the third maximum correlation and the fourth maximum correlation is greater than a third threshold, or store the second ROI in association with the value that is equal to the third maximum correlation when the fourth maximum correlation is less than the third maximum correlation and the third maximum correlation is greater than the third threshold, and
   wherein to determine the matching image, the LGN engine is to determine an image from the database stored in association with a greatest value.

7. The computing device of claim 1, wherein the LGN engine is to:
   obtain the plurality of stored images from a database using the one or more vertebrate features and the one or more fovea features, and for each image of the plurality of images from the database, determine another one or more vertebrate features for an image of the plurality of stored images and one or more other LGN features for the image of the plurality of images, determine a first ROI of the image of the plurality of stored images using the other one or more vertebrate features, determine a first maximum correlation between the other one or more vertebrate features and an object within the image of the plurality of stored images, when the first maximum correlation is greater than a first threshold, determine a second maximum between the one or more other LGN features and the one or more LGN features and a third maximum correlation between the first ROI and the one or more LGN features, determine a second ROI of the image of the plurality of stored images using the one or more other LGN features, and when the second maximum correlation is greater than the third maximum correlation, store, in the database, the second ROI in association with a value, wherein the value is equal to the second maximum correlation, when the second maximum correlation is less than the third maximum correlation, store, in the database, the first ROI in association with the value, wherein the value is equal to the third maximum correlation, and wherein to determine the matching image, the LGN engine is to determine an image from the database stored in association with a greatest value.

8. The computing device of claim 4, wherein the processor circuitry is to operate the LGN engine to:

determine one or more shape features of the first ROI and the second ROI using a feature extraction algorithm (FEA) or using a dominant based principal component analysis (DPCA).

9. The computing device of claim 1, further comprising:
a communication module; and
device interface circuitry,
wherein the image is to be obtained via one of the communication module or the device interface circuitry.

10. One or more non-transitory computer-readable storage media (NTCRSM) comprising instructions, wherein execution of the instructions by one or more processors is to cause a computer system to:

control receipt of an image via communication circuitry of the computer system or via device interface circuitry of the computer system;

operate a saccadic emulator to generate, from the obtained image, one or more blocks, wherein each block of the one or more blocks is representative of a region of the obtained image;

operate a vertebrate extraction engine to extract a vertebrate feature from the one or more blocks, wherein the vertebrate feature is representative of low resolution blocks of the one or more blocks;

operate a fovea extraction engine to extract a fovea feature from the one or more blocks, wherein the fovea feature are representative of high resolution blocks of the one or more blocks;

operate the LGN engine to extract an LGN feature based on the fovea feature;

control receipt of a plurality of stored images from one or more databases using the vertebrate feature and the fovea feature, and for each image of the plurality of images from the one or more databases:

determine whether the image has a correlated object, wherein the correlated object is an object having a first maximum correlation and a second maximum correlation, wherein the first maximum correlation is a correlation between the vertebrate feature and the object that is greater than a first threshold, and the second maximum correlation is a correlation between the fovea feature and the object that is greater than a second threshold, determine a first region of interest (ROI) of the correlated object for the vertebrate feature;

determine a second ROI of the correlated object for the fovea features, determine a third maximum correlation between the LGN feature and the first ROI, determine a fourth maximum correlation between the LGN feature and the second ROI, and control storage, in the one or more databases, of the first ROI in association with a value equal to the third maximum correlation when the fourth maximum correlation is greater than the third maximum correlation and the fourth maximum correlation is greater than a third threshold, or control storage, in the one or more databases, of the second ROI in association with the value that is equal to the third maximum correlation when the fourth maximum correlation is less than the third maximum correlation and the third maximum correlation is greater than the third threshold; and determine, as a matching image, a stored image from among the plurality of stored images including an object that is stored in association with a greatest value among the plurality of stored images.

11. The one or more NTCRSM of claim 10, wherein the one or more vertebrate features are extracted using a feature extraction algorithm (FEA) or using a dominant based principal component analysis (DPCA).

12. The one or more NTCRSM of claim 10, wherein the saccadic emulator is to emulate saccadic eye movements to generate the plurality of blocks, and wherein the fovea feature are determined based on the one or more vertebrate features and a block of the plurality of blocks that is a closest central position of the saccadic eye movements of the emulation.

13. The one or more NTCRSM of claim 10, wherein, to determine the fovea feature, execution of the instructions is to cause the computer system to operate the fovea extraction engine to:

perform a local background suppression and zoom-in operation on the vertebrate feature; and determine one or more shape features of the first ROI and the second ROI using a feature extraction algorithm (FEA) or using a dominant based principal component analysis (DPCA).

14. The one or more NTCRSM of claim 10, wherein, to determine the LGN feature from the fovea feature, execution of the instructions is to cause the computer system to operate the LGN engine to:

perform a downsampling operation or a decimation operation on the fovea feature to generate the LGN feature.

15. The one or more NTCRSM of claim 10, wherein execution of the instructions is to cause the computer system to operate the LGN engine to:

obtain the plurality of stored images from a database using the vertebrate feature and the fovea feature, and for each image of the plurality of images from the database, determine another fovea feature for an image of the plurality of stored images and another LGN feature for the image of the plurality of images,
determine a first ROI of the image of the plurality of stored images using the other fovea feature,
determine a first maximum correlation between the other fovea feature and an object within the image of the plurality of stored images,
  when the first maximum correlation is greater than a first threshold,
    determine a second maximum between the other LGN feature and the LGN feature and a third maximum correlation between the first ROI and the LGN feature,
    determine a second ROI of the image of the plurality of stored images using the other LGN feature, and
  when the second maximum correlation is greater than the third maximum correlation, store, in the database, the second ROI in association with a value, wherein the value is equal to the second maximum correlation,
  when the second maximum correlation is less than the third maximum correlation, store, in the database, the first ROI in association with the value, wherein the value is equal to the third maximum correlation, and
  wherein to determine the matching image, the LGN engine is to determine an image from the database stored in association with a greatest value.

16. A computer system comprising:
network interface circuitry to receive an image for analysis, and receive a plurality of stored images from one or more databases;
memory circuitry configured to store program code; and
processor circuitry coupled with the memory circuitry and the processor circuitry communicatively coupled with the network interface circuitry, the processor circuitry is configured to execute the program code to:
  generate, from the received image, one or more blocks based on a saccadic eye movement emulation, wherein each block of the one or more blocks is to represent a region of the obtained image;
  extract a first vertebrate feature from the one or more blocks, wherein the first vertebrate feature comprises one or more low resolution blocks of the one or more blocks;
  extract a fovea feature from the one or more blocks, wherein the fovea feature comprises one or more high resolution blocks of the one or more blocks;
  extract a first LGN feature based on the fovea feature;
  control the network interface circuitry to obtain the plurality of stored images from the one or more databases using the first vertebrate feature and the fovea feature; and
  for each image of the plurality of stored images:
    determine a second vertebrate feature for an image of the plurality of stored images,
    determine a second LGN feature for the image of the plurality of stored images,
    determine a first ROI of the image of the plurality of stored images using the second vertebrate feature,
    determine a first maximum correlation between the second vertebrate feature and an object within the image of the plurality of stored images,
    when the first maximum correlation is greater than a first threshold,
      determine a second maximum correlation between the second LGN feature and the first LGN feature,
      determine a third maximum correlation between the first ROI and the first LGN feature, and
      determine a second ROI of the image of the plurality of stored images using the second LGN feature,
    when the second maximum correlation is greater than the third maximum correlation: store, in the one or more databases, the second ROI in association with a value that is equal to the second maximum correlation, and
    when the second maximum correlation is less than the third maximum correlation: store, in the one or more databases, the first ROI in association with a value that is equal to the third maximum correlation;
  determine a matching image from the plurality of stored images in the one or more databases that is stored in association with a greatest value from among the plurality of stored images.

17. The computing system of claim 16, wherein the processor circuitry is configured to execute the program code to:
  extract the first and second vertebrate features using a feature extraction algorithm (FEA) or using a dominant based principal component analysis (DPCA); and/or
  operate a saccadic emulator to emulate the saccadic eye movements to generate the plurality of blocks, and wherein the fovea feature is determined based on the first vertebrate feature and a block of the plurality of blocks that is a closest central position of the saccadic eye movements of the emulation.

18. The computing system of claim 16, wherein:
to determine the fovea feature, the processor circuitry is configured to execute the program code to:
  perform a local background suppression and zoom-in operation on each of the first and second vertebrate features, and
  determine one or more shape features of the first ROI and the second ROI using a feature extraction algorithm (FEA) or using a dominant based principal component analysis (DPCA); and/or
to determine the first LGN feature from the fovea feature, the processor circuitry is configured to execute the program code to: perform a downsampling operation or a decimation operation on each of the fovea feature to generate the first LGN feature.

19. The computing system of claim 16, wherein the processor circuitry is configured to execute the program code to:
  obtain the plurality of stored images from the one or more databases using the first vertebrate feature and the fovea feature, and for each image of the plurality of images from the one or more databases,
    determine whether an image of the plurality of stored images has a correlated object, the correlated object being an object having a first maximum correlation that is greater than a first threshold and a second maximum correlation that is greater than a second threshold, wherein the first maximum correlation is between the first vertebrate feature and the object, and the second maximum correlation is between the fovea feature and the object,
    determine a first region of interest (ROI) of the correlated object for the first vertebrate feature and a second ROI of the correlated object for the fovea feature, determine a third maximum correlation between the first LGN feature and the first ROI and a fourth maximum correlation between the first LGN feature and the second ROI, and one of:

store, in the one or more databases, the first ROI in association with a value equal to the third maximum correlation when the fourth maximum correlation is greater than the third maximum correlation and the fourth maximum correlation is greater than a third threshold, or store, in the one or more databases, the second ROI in association with the value that is equal to the third maximum correlation when the fourth maximum correlation is less than the third maximum correlation and the third maximum correlation is greater than the third threshold; and wherein to determine the matching image, execution of the program code is to cause the processor circuitry to determine an image from the one or more databases stored in association with a greatest value from among the plurality of stored images.

20. The computing system of claim 16, wherein the processor circuitry is configured to execute the program code to:

generate a message to include the matching image or a location from which the matching image is to be obtained; and control the network interface circuitry to send a message to a user device.

* * * * *